United States Patent
Baert et al.

(10) Patent No.: US 12,421,724 B2
(45) Date of Patent: Sep. 23, 2025

(54) DECORATIVE PANEL AND METHOD FOR PRODUCING A PANEL

(71) Applicant: Champion Link International Corporation, The Valley (AI)

(72) Inventors: Thomas Luc Martine Baert, Sint-Martens-Latem (BE); Tom Van Poyer, Jiaxing (CN); Sven Boon, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 691 days.

(21) Appl. No.: 17/454,398

(22) Filed: Nov. 10, 2021

(65) Prior Publication Data

US 2023/0115926 A1    Apr. 13, 2023

(30) Foreign Application Priority Data

Oct. 7, 2021 (NL) ..................... 2029346

(51) Int. Cl.
| | |
|---|---|
| *E04C 2/24* | (2006.01) |
| *B32B 27/10* | (2006.01) |
| *B32B 27/30* | (2006.01) |
| *B32B 27/32* | (2006.01) |
| *B32B 27/36* | (2006.01) |
| *B32B 27/40* | (2006.01) |
| *E04F 13/08* | (2006.01) |
| *E04F 13/16* | (2006.01) |
| *E04F 15/02* | (2006.01) |
| *E04F 15/10* | (2006.01) |

(52) U.S. Cl.
CPC .............. *E04C 2/246* (2013.01); *B32B 27/10* (2013.01); *B32B 27/302* (2013.01); *B32B 27/304* (2013.01); *B32B 27/32* (2013.01); *B32B 27/36* (2013.01); *B32B 27/40* (2013.01); *E04F 13/0866* (2013.01); *E04F 13/0894* (2013.01); *E04F 13/16* (2013.01); *E04F 15/02038* (2013.01); *E04F 15/102* (2013.01); *E04F 15/105* (2013.01); *E04F 15/107* (2013.01); *B32B 2260/028* (2013.01); *B32B 2260/046* (2013.01); *B32B 2264/10* (2013.01); *B32B 2264/1022* (2020.08); *B32B 2264/1023* (2020.08); *B32B 2307/536* (2013.01); *B32B 2307/72* (2013.01); *B32B 2419/00* (2013.01); *B32B 2607/00* (2013.01); *E04F 2201/023* (2013.01); *E04F 2201/043* (2013.01)

(58) Field of Classification Search
CPC ................................ E04C 2/246; B32B 27/10
See application file for complete search history.

(56) References Cited

U.S. PATENT DOCUMENTS

| | | | | |
|---|---|---|---|---|
| 11,946,251 | B2 * | 4/2024 | Baert | ............... B05D 3/067 |
| 2006/0032175 | A1 * | 2/2006 | Chen | ............... B32B 21/08 |
| | | | | 52/578 |
| 2014/0170359 | A1 | 6/2014 | Schwitte et al. | |

FOREIGN PATENT DOCUMENTS

| | | |
|---|---|---|
| CN | 112793278 A | 5/2021 |
| KR | 20200046476 A | 5/2020 |
| WO | 9917930 A1 | 4/1999 |
| WO | 2006033706 A1 | 3/2006 |
| WO | 2010088769 A1 | 8/2010 |
| WO | 2017121389 A1 | 7/2017 |
| WO | 2019228621 A1 | 12/2019 |
| WO | 2020007253 A1 | 1/2020 |
| WO | 2020009973 A1 | 1/2020 |
| WO | 2021180882 A1 | 9/2021 |

OTHER PUBLICATIONS

MgO_Board_MagPanel_Versatile_Building_Products_Ambient_.pdf https://www.ambientbp.com/mgo-magnesium-oxide-boards-magboard.php (Year: 2024).*
Chinese First Office Action (Notice of First Examination Opinion), dated Jul. 10, 2024, based on CN Application No. 202111519669.8, 10 pages.
European Patent Office Search Report in NL 2029346 dated Oct. 7, 2021.
European Patent Office Search Report in NL 2029345 dated Oct. 7, 2021.
European Patent Office Search Report in NL 2028108 dated Apr. 30, 2021.
Thomas Luc Martine Baert et al.; Decorative Panel; U.S. Appl. No. 17/454,381, filed Nov. 10, 2021.
Thomas Luc Martine Baert et al.; Flooring Panel; U.S. Appl. No. 17/380,581, filed Jul. 20, 2021.
Thomas Luc Martine Baert et al.; Flooring Panel; U.S. Appl. No. 17/804,425, filed May 27, 2022.

* cited by examiner

*Primary Examiner* — Babajide A Demuren
(74) *Attorney, Agent, or Firm* — Heslin Rothenberg Farley & Mesiti P.C.

(57) ABSTRACT

The invention relates to a decorative panel, in particular a floor panel, wall panel or ceiling panel, the panel comprising at least one core layer comprising an upper core surface and a bottom core surface, wherein the core layer comprises a composite material comprising at least one mineral material and at least one polymer and at least one top layer comprising at least one ply of resin impregnated paper, wherein the core layer has a predetermined Vicat softening temperature and wherein the upper core surface of the core layer has a predetermined Shore D hardness such that a panel is obtained which has good waterproof- and scratch resistant properties.

19 Claims, No Drawings

DECORATIVE PANEL AND METHOD FOR PRODUCING A PANEL

CROSS REFERENCE TO RELATED APPLICATIONS

This application claims priority under 35 U.S.C. $119 to Netherland Patent Application No. NL 2029346 filed on Oct. 7, 2021, which is incorporated herein by reference in its entirety.

FIELD OF THE INVENTION

The invention relates to a decorative panel, in particular a floor panel, wall panel or ceiling panel. The invention also relates to a method for producing a decorative panel.

BACKGROUND

Research is done in flooring in order to attempt to combine the advantages of a thermoplastic core material (water resistance) and a thermosetting resin impregnated cellulose top layer (scratch resistance). Difficulties arise when trying to sufficiently bond the different layers without being sensitive to delamination or having to use a rather complex production process. A thermoplastic composite core can generally not withstand the pressure and heat required to cure the uncured resins impregnating the top layer, nor the heat required to activate the hardener present in the polymeric adhesive bonding the core and top layer together. Thermoplastics such as polyvinyl chloride (PVC) core are known to soften and even melt completely at elevated temperatures, for example PVC which has a low Vicat softening temperature at about 65 degrees Celsius and a melting point around 150 degrees Celsius. When attempting to produce according to the prior art, this deformation of the core leads to uneven thicknesses, fractures of the rigid top layers and the like. As a thermosetting resin impregnating the top layer, for example melamine resin, is known to only cure at temperatures higher than 150 degrees Celsius, increasing the viscosity and rigidity of the core at a higher temperature is required. Further, the adhesion of a thermosetting top layer on a thermoplastic core necessitates the use of an adhesive layer comprising a thermosetting resin and a polymeric adhesive or epoxy which requires heat higher than 150 degrees Celsius to activate.

DETAILED DESCRIPTION

It is an objective of the invention, to at least partially limit or eliminate the above indicated drawbacks of the known process for producing a panel or at least to provide an alternative to the current state of the art.

The invention thereto relates to a decorative panel, in particular a floor panel, wall panel or ceiling panel, the panel comprising:
- at least one core layer comprising an upper core surface and a bottom core surface and preferably two pairs of opposing side edges, wherein the core layer comprises a composite material comprising at least one mineral material and/or at least one polymer; and
- at least one top layer comprising at least one ply of resin impregnated paper;
- wherein at least one ply of paper is impregnated with a resin composition comprising at least one thermosetting resin and/or at least one polymeric adhesive;
- wherein the core layer has a Vicat softening temperature of at least 80 degrees Celsius, preferably at least 85 degrees Celsius and/or and wherein the upper core surface of the core layer has a Shore D hardness of at least 85.

The panel according to the present invention has several benefits over panels according to the prior art. The combination of a core layer comprising at least one mineral material and at least one polymer a top layer comprising at least one ply of resin impregnated paper, wherein at least one ply of paper is impregnated with a resin composition comprising at least one thermosetting resin and/or optionally at least one polymeric adhesive and wherein the core layer has a Vicat softening temperature of at least 80 degrees Celsius, preferably at least 85 degrees Celsius and/or and wherein the upper core surface of the core layer has a Shore D hardness of at least 85 results in a panel having the waterproof benefits of an PVC panel but also the beneficial scratch resistance of a panel finished with a resin impregnated paper. The use of a core layer having a Vicat softening temperature of at least 80 degrees Celsius and an upper core surface of the core layer having a Shore D hardness of at least 85, preferably at ambient temperature and/or at a temperature of 23 degrees Celsius, results in a core layer having a relatively high hardness whilst the core composition has the ability to maintain this hardness when being heated up, such as during attachment of the top layer(s). Hence, the combination of these technical characteristics prevents deformation of the core layer during production, use and/or handling. This technical effect was surprisingly found as a person skilled in the art would not consider the synergy between hardness of the core layer and Vicat softening point to positively contribute to lamination of a paper layer at elevated temperatures. A person skilled in the art might consider either of these two as a contributing feature, but not a synergy of the above. The panel according to the present invention further benefits of a relatively good shrinking rate wherefore characteristic deformation of the panel, for example during hot pressing, is prevented. This can at least partially be explained by the use of a core layer comprising a composite material comprising at least one mineral material and at least one polymer and having a Vicat softening temperature of at least 80 degrees Celsius and/or a Shore D hardness of at least 85. The use of at least one mineral material in the core layer is conceived to impart a sufficient rigidity, advantageously higher than 4000 Mpa MOE and 22 Mpa MOR thereby ensuring dimensional stability and toughness of the panel. The use of at least one polymer in the core layer is conceived to impart flexibility characteristics to the panel when deemed necessary, or for example when flexibility is required to achieve engagement of a locking mechanism, if applied, advantageously lower than 9000 Mpa and 36 Nm MOR. The core layer according to the present invention can provide rigidity and strength to allow, for example, a floating installation, but is also suitable to provide a substantially flat surface on which a top layer can be efficiently attached. The core layer according to the present invention is in particular configured and suitable for use in a thermo bonding process. That the at least one top layer comprises at least one ply of resin impregnated paper, wherein at least one ply of paper is impregnated with a resin composition comprising at least one thermosetting resin and/or at least one polymeric adhesive results in the top layer being directly attachable to the core layer, for example via applying heat and/or pressure, without the need of an intermediate adhesive layer whilst the top layer has a substantially good strength and scratch resistance.

When it is referred to Vicat softening temperature also softening temperature can be meant. The top layer can also be referred to as decorative top layer. At least one ply of resin impregnated paper top. The top layer is typically a ply of cured resin impregnated paper. At least one ply of paper can also be a cellulose and/or lignocellulose-based ply within the scope of the present invention. It is for example conceivable that lignocellulose is applied as a pulp and dried to form a ply. The at least one polymeric adhesive, if applied, can also be referred to as a polymer adhesive and/or as polymeric adhesive compound. When it is referred to a core layer said layer could also be called a carrier layer, carrier plate, carrier, core and/or panel core.

Preferably, at least one ply of resin impregnated paper is in direct contact with the upper core surface of the core layer. Hence, at least one ply of resin impregnated paper is directly attached to the upper core surface of the core layer. Preferably at least one ply of paper which is impregnated with a resin composition comprising at least one polymeric adhesive is in direct contact with the upper core surface of the core layer. Due to the combination of the ply of paper which is impregnated with a resin composition comprising at least one thermosetting resin and/or at least one polymeric adhesive and the core layer according to the present invention the both layers can be attached without the requirement of an adhesive layer in between said layers. Said attachment can for example be done via thermo bonding such as by applying heat and/or pressure. Hence, the use of an adhesive layer in between the top layer and the core layer can be omitted.

In a preferred embodiment, at least one ply of resin impregnated paper comprises at least one polymeric adhesive, preferably at least 1 wt % of polymeric adhesive and preferably at least 5 wt % of polymeric adhesive. It is also conceivable that at least one ply of resin impregnated paper comprises in the range of 1 wt % to 20 wt % of polymeric adhesive, preferably in the range of 2.5 wt % to 15 wt % of polymeric adhesive, more preferably in the range of 5 wt % to 10 wt % of polymeric adhesive. If applied, the polymeric adhesive applied in the ply or plies of resin impregnated paper can be of importance for the bonding between the top layer and the core layer. It is for example conceivable that at least one polymeric adhesive is grafted inside the top layer. It is also conceivable that the resin composition comprises at least 1 wt % of polymeric adhesive and preferably at least 5 wt % of polymeric adhesive. It is also conceivable that the resin composition comprises in the range of 1 wt % to 20 wt % of polymeric adhesive, preferably in the range of 2.5 wt % to 15 wt % of polymeric adhesive, more preferably in the range of 5 wt % to 10 wt % of polymeric adhesive. It is for example conceivable that at least one polymeric adhesive of the resin composition comprises polyurethane, polyester and/or a polyepoxide, such as but not limited to epoxy resin. At least one polymeric adhesive of the resin composition can for example be polyurethane, polyester and/or a polyepoxide.

The thermosetting resin may for example comprise phenolic resin, melamine resin and/or formaldehyde resin. The thermosetting resin may for example also comprise melamine formaldehyde.

In a preferred embodiment, the cellulose content of at least one ply of resin impregnated paper has a weight of at least 40 grams, preferably at least 70 grams. It is also conceivable that at least one ply of paper of the top layer has a weight of at least 25 grams, preferably at least 40 grams, more preferably at least 70 grams. The paper, or resin impregnated paper, can for example have a weight in the range of 70 to 80 grams. The resin load of at least one ply of resin impregnated paper is preferably at least 90%, more preferably at least or substantially 100%. A substantially fully resin impregnated paper is beneficial for the waterproofness of the top layer and for the scratch resistance thereof.

With regard to the core layer, it is preferred that at least one polymer of the composite material is a thermoplastic polymer and/or at least one polymer of the composite material is an elastomer. The use of at least one thermoplastic or elastomeric polymer in the core layer is conceived to impart flexibility characteristics to the panel when deemed necessary, for example when flexibility is required to achieve engagement of a locking mechanism. At least one polymer of the composite material can for example chosen from the group of polyvinylchloride (PVC), polypropylene (PP), polyethylene terephthalate (PET), polystyrene (PS), polyethylene (PE), polyurethane (PU), acrylonitrile butadiene styrene (ABS) and/or co-polyester (CPE).

It is further preferred that at least one mineral material of the composite material is a magnesium-based mineral material, in particular chosen from the group of magnesium oxide (MgO), magnesium chloride (MgCl or MOC cement) and/or magnesium oxysulfate (MOS cement). It is also conceivable that at least one mineral material of the composite material comprises calcium carbonate (CaCO3), chalk, clay, calcium silicate and/or talc. Said materials are known to provide a good rigidity to the core layer.

In a beneficial embodiment, the composite material of the core layer has a ratio of mineral material to polymer of at least 3:1. Such relatively large percentage of mineral material provides a good rigidity and dimension stability to the core layer whilst the polymer fraction is sufficient to provide a desired level of flexibility. This composition is also beneficial to obtain a desired shrinking rate, in particular of below 0.05%. The content of mineral material may also have a positive effect on the desired minimum Shore D hardness of the upper core surface of the core layer. The upper core surface of the core layer preferably has a Shore D hardness of at least 85. It is also conceivable that the upper core surface of the core layer has a Shore D hardness in the range of 85 to 95. The core layer having a ratio of mineral material to polymer of at least 3:1 may also lead to the core layer having a relatively high surface energy which is positive for bonding between the core layer and the top layer according to the present invention.

The addition of at least one Vicat modifier, in particular to the composite material of the core layer, may also further improve the material properties of the core layer. The composite material of the core layer may for example comprise at least one additive configured to increase the Vicat softening temperature. The Vicat softening temperature of the core layer is preferably at least 80 degrees Celsius. It is also conceivable that the Vicat softening temperature is at least 82 degrees Celsius, at least 83 degrees Celsius, at least 84 degrees Celsius or at least 85 degrees Celsius. It is also conceivable that the Vicat softening temperature of the core layer is in the range of 80 to 95 degrees Celsius, or in the range of 85 to 95 degrees Celsius. The Vicat softening temperature of the core layer could for example also be substantially 90 degrees Celsius. Optionally, the Vicat softening temperature of the core layer can be higher than 95 degrees Celsius. It is also conceivable that the composite material has a Vicat softening temperature of at least 80 degrees Celsius, preferably at least 85 degrees Celsius. At least one additive could for example comprise acrylonitrile styrene acrylate (ASA), acrylonitrile butadiene styrene (ABS), a thermoset system and/or an epoxy system. At least one additive can also be a Vicat modifier or referred to as Vicat modifier.

In an alternative embodiment, it is possible that at least one polymer of the composite material is a thermosetting polymer. Hence, it is also conceivable that at least one polymer of the composite material of the core layer comprises at least one phenolic resin, melamine resin and/or formaldehyde resin. The applied resin can for example be a thermosetting resin. It is also beneficial if the composite material of the core layer comprises at least one thermosetting resin and/or at least one polymeric adhesive. It is for example conceivable that in case the composite material comprises at least one thermosetting resin and/or at least one polymeric adhesive which equal the at least one thermosetting resin and/or at least one polymeric adhesive applied in the resin composition of at least one resin impregnated ply of paper of the top layer.

In a beneficial embodiment of the panel, the upper core surface of the core layer has a surface energy of at least 50 dyn/cm. This characteristic enables good adhering of a resin impregnated ply. Thermoplastics such as PVC, PET, PP and the like typically have a rather low surface energy of less than 50 dyn/cm and often even less than 40 dyn/cm which make a core layer made of said materials unsuitable for adhering a resin paper directly. The surface energy of the core layer being below a required value can cause delamination of the resin impregnated ply or plies of the top layer, in particular when the panel is exposed to water and/or heat for a period of time. It is for example conceivable that the surface energy of the core layer is increased by means of a plasma or corona treatment of said surface. An appropriate synergy of surface energy and roughness can positively contribute the prevention of delamination. It is in particular preferred that the core layer has a (surface) roughness (Ra) of at least 0.5 μm. More preferably, the roughness of the core layer is at least 1 μm. Hence, the upper core surface of the core layer may have a roughness of at least 0.5 μm, preferably at least 1 μm. These characteristic enables proper bonding between the upper core layer and the top layer, in particular the resin composition of the top layer.

The core layer can for example have a modulus of elasticity, or rigidity, of at least 3500 MPa, in particular when tested according to EN310 or ASTM D790. The thickness of the core layer is preferably between 3 and 9 mm, more preferably between 4 mm and 5.5 mm or between 5.5 mm and 7 mm. In a beneficial embodiment, the density of the core layer is at least 1200 kg/m3, and preferably at least 1400 kg/m3. It is also conceivable that the density of the core layer is in the range of 1600 to 2100 kg/m3.

It is also conceivable that the bottom core surface of the core layer has a Shore D hardness of at least 85 or in the range of 85 to 95. This is in particular beneficial in case a backing layer is applied. The panel according to the present invention may comprise at least one backing layer comprising at least one ply of resin impregnated paper, wherein at least one ply of paper is impregnated with a resin composition comprising at least one thermosetting resin and/or at least one polymer adhesive. It is conceivable that the backing layer substantially equals the top layer. Hence, any of the described top layer could also be applied as backing layer attached to a bottom core surface of the core layer. The backing layer, if applied, can be directly attached to the bottom core surface of the core layer. The backing layer can for example be a balancing layer. The bottom core surface of the core layer can have equal characteristics as the upper core surface. In a preferred embodiment is the weight of the backing layer is higher than the weight of the top layer. It is for example conceivable that the backing layer has a weight of at least 70 grams, preferably at least 100 grams, more preferably at least 120 grams. A relatively heavy backing layer is beneficial for the balancing function of the backing layer. The total paper weight and/or resin load of the backing layer can for example be at least the same or higher as respectively the total paper weight and/or resin load of the top layer. Hence, it is conceivable that the panel comprises at least one backing layer preferably attached to the bottom surface of the lower core layer which substantially differs from the top layer. The backing layer may provide a protective function for the core layer and thus for the panel as such. An bottom surface of the backing layer may for example comprise an adhesive layer. It is also conceivable that the backing layer is a balancing layer, preferably configured for stabilization and/or protection of the panel. A balancing layer may for example prevent cupping, warping and/or bowing of the panel. The balancing layer could also be referred to as stabilizing layer. The presence of a backing layer may further contribute to the acoustic performance of the panel as the backing layer may have sound dampening properties and/or to the ease of installation of the panel. Further, the backing layer may form a moist barrier. The backing layer can also be made of a polymer material, for example but not limited to polyurethane. It is also conceivable that the panel comprises a combination of any of the mentioned examples of possible backing layers. Further, the backing layer may also be a sound absorbing layer. Such sound absorbing backing layer may contribute to the acoustic properties of the panel. Such backing layer may also be referred to as acoustic layer. The backing layer may be composed of a foamed layer, preferably a low density foamed layer, of ethylene-vinyl acetate (EVA), irradiation-crosslinked polyethylene (IXPE), expanded polypropylene (XPP) and/or expanded polystyrene (XPS). However, it is also conceivable that the backing layer comprises nonwoven fibers such as natural fibers like hemp or cork, and/or recycled/recyclable material such as PET. The backing layer, if applied, preferably has a density between 65 kg/m3 and 300 kg/m3, most preferably between 80 kg/m3 and 150 kg/m3.

At least one top layer may comprise at least one décor layer. It is for example conceivable that the top layer is a decorative top layer. It is also conceivable that at least one ply of paper is a décor paper. The panel may optionally comprise at least one wear layer. The wear layer could either form part of the top layer or the wear layer can form integral part of the top layer. At least one ply of resin impregnated paper can be a substantially transparent ply. It is further conceivable that at least one top layer comprises multiple plies of resin impregnated paper, wherein at least one ply of paper, and preferably each ply of paper, is impregnated with a resin composition comprising at least one thermosetting resin and/or at least one polymeric adhesive. In case multiple plies of resin impregnated paper are applied, it is beneficial if at least the bottom ply, which is attached to the upper core layer, comprises at least one polymer adhesive. Since the polymer adhesive is an important component for the bonding between the top layer and the core layer, it is of preference that at least the bottom layer of the layer of plies, or ply, which is in contact with the core surface, is impregnated with a resin composition comprising at least one thermosetting resin and/or at least one polymeric adhesive.

Several compositions of a top layer comprising at least one ply or multiple plies of resin impregnated paper are conceivable. It is for example conceivable that at least one ply of paper is a décor paper. It is also conceivable that at least one ply of paper is a reinforcing paper. The use of a transparent ply of paper is also conceivable. In case a plurality of plies is applied, different types of papers can be used. An embodiment is for example imaginable wherein the top layer comprises from top to bottom at least one first ply of transparent paper of at least 50 g which is impregnated with at least one thermosetting resin and comprising a plurality of abrasion resistant particles and/or at least one antibacterial agent and at least one second ply of décor paper of at least 70 g, impregnated with at least one thermosetting resin and/or at least one polymeric adhesive.

An embodiment is conceivable wherein the top layer comprises a plurality of abrasion resistant particles. Said abrasion resistant particles are preferably chosen from the group of aluminum oxide, corundum, silicon carbide, titanium dioxide, titanium oxide and/or diamond particles. It is for example conceivable that the abrasion resistant particles are dispersed in the resin composition of the top layer. In case a wear layer is applied, it is also conceivable that the wear layer comprises a plurality of abrasion resistant particles. The abrasion resistant particles may then for example be dispersed in the wear layer. In case the top layer comprises multiple plies of resin impregnated paper, preferably at least one layer comprises a plurality of abrasion resistant particles, more preferably at least the upper ply of the plies comprises said abrasion resistant particles. Alternatively, it is also conceivable that the abrasion resistant particles are applied in the uncured or semi cured resin composition, such that the abrasion resistant particles are applied over the plurality of plies after the cross linking between layers.

The top layer may further comprise at least one resin impregnated ply of paper comprising at least one antibacterial agent, preferably zinc oxide (ZnO) and/or silver nanoparticles or the like. It is also conceivable that the resin composition with which at least one ply of paper is impregnated comprises at least one antibacterial agent, preferably metal oxides such as titanium dioxide (TiO2), zinc oxide (ZnO), or isothiazolinone, zinc pyrithione, thiabendazole, and/or silver nanoparticles. The presence of at least one antibacterial agent can be beneficial in case it desired to apply the floor panel or floor covering made of such panel for business, industries or areas where a high hygiene standard is present. In case a wear layer or overlay is applied, it is also conceivable that the antibacterial agent is present in the wear layer or overlay. The antibacterial agent may form integral part of the top layer. A panel comprising a top layer which comprises at least one antibacterial agent typically provide a much better protection against bacteria, fungus, parasites and/or viruses compared to panels which are covered with an antibacterial agent.

It is beneficial if at least one top layer and at least one core layer are bonded via the provision of heat and/or pressure. At least one top layer and at least one core layer can for example be bonded via thermo bonding. It is beneficial to apply thermo bonding as for the use of an intermediate adhesive layer between the top layer and the core layer can be omitted. The use of the core layer and top layer according to the present invention allow the application of a thermo bonding process.

In a preferred embodiment, the panel comprises two pairs of opposite side edges, wherein at least one pair of opposite side edges, and preferably each pair of opposite side edges, is provided with complementary coupling parts. The core layer of the panel according to the present invention may comprise at least one pair of opposing (side) edges, said pair of opposing (side) edges comprising complementary coupling parts configured for mutual coupling of adjacent panels. The coupling parts may form part of the core layer. The coupling parts of the panel may for example be interlocking coupling parts, which are preferably configured for providing both horizontal and vertical locking. Interlocking coupling parts are coupling parts that require elastic deformation, a click or a movement in multiple directions to couple or decouple the parts with or from each other. Any suitable interlocking coupling parts as known in the art could be applied. A non-limiting example is an embodiment wherein a first edge of said first pair of opposing edges comprises a first coupling part, and wherein a second edge of said first pair of opposing edges comprises a complementary second coupling part, said coupling parts allowing a plurality of panels to be mutually coupled; wherein the first coupling part comprises a sideward tongue extending in a direction substantially parallel to a plane defined by the panel, and wherein the second coupling part comprises a groove configured for accommodating at least a part of the sideward tongue of another panel, said groove being defined by an upper lip and a lower lip. It is conceivable the complementary coupling parts require a downward scissoring motion when engaging, or are locked together by means of a horizontal movement. It is further conceivable that the interconnecting coupling parts comprise a tongue and a groove wherein the tongue is provided on one side edge of one pair of opposing side edges, and the groove is provided on the other side edge, or an adjacent side relative to that of the tongue, of the same pair of opposing side edges. Such a design of a coupling mechanism is well-known in the art and has proven highly suitable for panels for floor coverings such as a floating floor. In a further embodiment it is possible that the interconnecting coupling parts have an interlocking feature which prevents interconnected panels from any free movement (play). Such an interlocking feature may be a projection and a respective recess provided on the respective opposing side edges by which neighboring panels interlock with each other. It is conceivable for provisions of reinforcement in the interlocking coupling parts to improve strength and prevent breakage thereof during installation of the panels. For example, the complementary or interlocking coupling parts may be reinforced with materials such as but not limited to fiberglass mesh, reinforcing sheets, carbon fibers, carbon nanotubes, ceramics, glass, arrays of metallic or non-metallic rods, or polymer compounds integrally formed in the core layer. It is also conceivable that a strengthening coat layer of micro or nanotechnology is added on the surface of the interlocking coupling parts. The panel according to the present invention and/or the panel obtained via the method according to the present invention is suitable for use in flooring, wall or ceiling coverings preferably featuring a locking mechanism. As such a 'floating' covering can be assembled by interconnecting the individual panels with each other at all four sides, without the need for adhesives.

The invention also related to the alternative embodiment wherein the decorative panel, in particular a floor panel, wall panel or ceiling panel, the panel comprising at least one core layer; the core layer comprising an upper core surface and a bottom core surface and two pairs of opposing side edges, wherein the core layer comprises at least one thermoplastic binder and at least one filler, and at least one top layer comprising at least one ply of resin impregnated paper, wherein at least one ply of paper is impregnated with at least one resin composition comprising at least one thermosetting resin and/or at least one polymer adhesive, wherein the core layer has a Vicat softening temperature of at least 80 degrees Celsius, preferably at least 85 degrees Celsius and/or wherein the upper core surface of the core layer has a Shore D hardness of at least 85. The core layer may further comprise at least one additive, for example as described in the present application. The core layer can be a mineral composite comprising at least one thermoplastic material.

The panel according to the present invention may even have a shrinking rate which is lower than 0.15%, and in particular lower than 0.05%, when measured, for example, according to ISPO 23999.

The invention also relates to a method for producing a decorative panel, in particular a floor panel, wall panel or ceiling panel, in particular according to any of the embodiment according to the present invention, the method comprising the steps of:
  a) providing at least one core layer, the core layer comprising an upper core surface and a bottom core surface, which core layer comprises a composite material comprising at least one mineral material and/or at least one polymer, wherein the core layer has a softening temperature of at least 80 degrees Celsius, preferably at least 85 degrees Celsius and/or wherein the upper core surface of the core layer has a Shore D hardness of at least 85;
  b) providing at least one top layer comprising at least one ply of resin impregnated paper upon the upper core surface of said core layer, wherein at least one ply of paper is impregnated with a resin composition comprising at least one thermosetting resin and/or at least one polymeric adhesive;
  c) applying a pressure of at least 12 MPa and a heat of at least 130 degrees Celsius onto the upper surface of the top layer for a first predetermined amount of time;
  d) reducing the temperature to a value below 40 degrees Celsius whilst remaining the pressure of at least 12 MPa for a second predetermined amount of time.

The method according to the present invention enables the provision of a panel according to the present invention in a relatively simple and commercially interesting way. The applied core layer has a relatively high hardness whilst the core composition has the ability to maintain this hardness when being heated up, during attachment of the top layer(s). The method according to the present invention further does not address the problem of thermal expansion under heat of the core layer as well as the shrinking under heat of the resin impregnated ply of paper of the top layer due to the chosen characteristics. Undesired bending and/or cupping of the final product can hence be prevented. The preferred predetermined time intervals are dependent on several factors. The first predetermined amount of time is preferably in the range of 30 to 60 minutes, more preferably in the range of 40 to 50 minutes. The second predetermined amount of time can for example be in the range of 5 to 30 minutes, preferably in the range of 10 to 20 minutes. It is also conceivable that the first and/or second predetermined amount of time are in the range of 40 to 45 minutes. It is preferred that the pressure and/or heat is applied via at least one embossing element. The embossing element can for example be an embossing plate. The use of an embossing element can provide a predetermined surface structure onto the upper surface of the top layer, which may be desired for technical and/or aesthetic reasons. The temperature applied during step c) is preferably in the range of 130 to 150 degrees Celsius. However, it is also conceivable that the temperature applied during step c) is above 150 degrees Celsius. It is conceivable that the upper core surface of the core layer is annealed, sanded and/or corona treated prior to step c). Such treatment may further increase for example the surface energy of the core layer, which can be of positive influence for the bonding process. The method may further comprise the of annealing at a temperature of at least 90 degrees Celsius and a substantially constant pressure of at least 1 Mpa for at least 1 minute, which can be referred to as step e). Alternatively or additionally, the core layer could be annealed, for example at a temperature of at least 90 degrees Celsius and a substantially constant pressure of at least 1 Mpa for at least 1 minute, prior to step c).

The method may further comprise the provision and/or attachment of at least one backing layer, for example an embodiment thereof as described for the present invention. The method may also comprise the step of machining of at least two edges of the panel which that complementary coupling parts are provided.

The invention will now be elucidated into more detail with reference to the following non-limitative clauses.
  1. Decorative panel, in particular a floor panel, wall panel or ceiling panel, the panel comprising:
     at least one core layer comprising an upper core surface and a bottom core surface, wherein the core layer comprises a composite material preferably comprising at least one mineral material and/or at least one polymer; and
     at least one top layer comprising at least one ply of resin impregnated paper;
     wherein at least one ply of paper is impregnated with a resin composition comprising at least one thermosetting resin and/or at least one polymeric adhesive;
     wherein the core layer has a Vicat softening temperature of at least 80 degrees Celsius and/or wherein the upper core surface of the core layer has a Shore D hardness of at least 85.
  2. Panel according to clause 1, wherein at least one ply of resin impregnated paper is in direct contact with the upper core surface of the core layer.
  3. Panel according to any of the previous clauses, wherein at least one ply of resin impregnated paper comprises at least 1 wt % of polymeric adhesive, preferably at least 5 wt %.
  4. Panel according to any of the previous clauses, wherein at least one polymeric adhesive of the resin composition comprises polyurethane, polyester and/or a polyepoxide.
  5. Panel according to any of the previous clauses, wherein at least one ply of resin impregnated paper has a weight of at least 40 grams, preferably at least 70 grams.
  6. Panel according to any of the previous clauses, wherein the resin load of at least one ply of resin impregnated paper is substantially 100%.
  7. Panel according to any of the previous clauses, wherein at least one polymer of the composite material is a thermoplastic polymer and/or at least one polymer of the composite material is thermosetting polymer.
  8. Panel according to any of the previous clauses, wherein at least one polymer of the composite material is chosen from the group of polyvinylchloride, polypropylene, polyethylene terephthalate, polystyrene, polyethylene, polyurethane, acrylonitrile butadiene styrene and/or co-polyester.
  9. Panel according to any of the previous clauses, wherein at least one mineral material of the composite material is a magnesium-based mineral material, in particular chosen from the group of magnesium oxide, magnesium chloride and/or magnesium oxysulfate.

10. Panel according to any of the previous clauses, wherein at least one mineral material of the composite material comprises calcium carbonate, chalk, clay, calcium silicate and/or talc.
11. Panel according to any of the previous clauses, wherein the composite material has a ratio of mineral material to polymer of at least 3:1.
12. Panel according to any of the previous clauses, wherein the composite material further comprises at least one additive configured to increase the Vicat softening temperature.
13. Panel according to clause 12, wherein additive comprises acrylonitrile styrene acrylate, acrylonitrile butadiene styrene, a thermoset system and/or an epoxy system.
14. Panel according to any of the previous clauses, wherein the upper core surface of the core layer has a surface energy of at least 50 dyn/cm.
15. Panel according to any of the previous clauses, wherein the upper core surface of the core layer has a roughness of at least 0.5 µm, preferably at least 1 µm.
16. Panel according to any of the previous clauses, wherein the thickness of the core layer is between 3 and 9 mm, preferably between 4 mm and 5.5 mm or between 5.5 mm and 7 mm.
17. Panel according to any of the previous clauses, wherein the core layer has a density of at least 1400 kg/m3.
18. Panel according to any of the previous clauses, wherein the bottom core surface of the core layer has a Shore D hardness of at least 85.
19. Panel according to any of the previous clauses, comprising at least one backing layer comprising at least one ply of resin impregnated paper, wherein at least one ply of paper is impregnated with a resin composition comprising at least one thermosetting resin and/or at least one polymer adhesive.
20. Panel according to clause 19, wherein the weight of the backing layer is higher than the weight of the top layer.
21. Panel according to any of the previous clauses, wherein the top layer comprises at least one décor layer and/or wherein the top layer comprises at least one wear layer.
22. Panel according to any of the previous clauses, wherein at least one top layer comprises multiple plies of resin impregnated paper, wherein at least one ply of paper is impregnated with a resin composition comprising at least one thermosetting resin and/or at least one polymeric adhesive
23. Panel according to any of the previous clauses, wherein the top layer comprises a plurality of abrasion resistant particles, in particular chosen from the group of aluminum oxide, corundum, silicon carbide, titanium dioxide, titanium oxide and/or diamond particles.
24. Panel according to any of the previous clauses, wherein the top layer comprises at least one resin impregnated ply of paper comprising at least one antibacterial agent, preferably zinc oxide and/or silver nanoparticles.
25. Panel according to any of the previous clauses, wherein the top layer and the core layer are bonded via thermo bonding.
26. Panel according to any of the previous clauses, wherein the panel comprises two pairs of opposite side edges, wherein at least one pair of opposite side edges, and preferably each pair of opposite side edges, is provided with complementary coupling parts.
27. Method for producing a decorative panel, in particular a floor panel, wall panel or ceiling panel, in particular according to any of the previous clauses, comprising the steps of:
    a) providing at least one core layer, the core layer comprising an upper core surface and a bottom core surface, which core layer comprises a composite material comprising at least one mineral material and at least one polymer, wherein the core layer has a softening temperature of at least 80 degrees Celsius, preferably at least 85 degrees Celsius and/or wherein the upper core surface of the core layer has a Shore D hardness of at least 85;
    b) providing at least one top layer comprising at least one ply of resin impregnated paper upon the upper core surface of said core layer, wherein at least one ply of paper is impregnated with a resin composition comprising at least one thermosetting resin and/or at least one polymeric adhesive;
    c) applying a pressure of at least 12 MPa and a heat of at least 130 degrees Celsius onto the upper surface of the top layer for a first predetermined amount of time;
    d) reducing the temperature to a value below 40 degrees Celsius whilst remaining the pressure of at least 12 MPa for a second predetermined amount of time.
28. Method according to clause 27, wherein the first predetermined amount of time is in the range of 30 to 60 minutes, preferably in the range of 40 to 50 minutes and/or wherein the second predetermined amount of time is in the range of 5 to 30 minutes, preferably in the range of 10 to 20 minutes.
29. Method according to clause 27 or 28, wherein the pressure and/or heat is applied via at least one embossing element.
30. Method according to any of clauses 27-29, wherein the temperature applied during step c) is in the range of 130 to 150 degrees Celsius.
31. Method according to any of clauses 27-30, wherein the upper core surface of the core layer is be annealed, sanded and/or corona treated prior to step c).
32. Method according to any of clauses 27-31, comprising step d) annealing at a temperature of at least 90 degrees Celsius and substantially constant pressure of at least 1 Mpa for at least 1 minute.

It will be apparent that the invention is not limited to the examples described, but that numerous variants are possible within the scope of the attached claims that will be obvious to a person skilled in the art. It is not necessary to elaborate on examples of all conceivable combinations of the above-described inventive concepts, as a person skilled in the art will understand numerous inventive concepts can be (re) combined in order to arrive at a specific application.

The verb "comprise" and conjugations thereof used in this patent publication are understood to mean not only "comprise", but are also understood to mean the phrases "contain", "substantially consist of", "formed by" and conjugations thereof.

The invention claimed is:
1. A decorative panel, the panel comprising:
   at least one core layer comprising an upper core surface and a bottom core surface, wherein the core layer comprises a composite material comprising at least one mineral material and at least one polymer in a ratio of at least 3:1; and at least one top layer comprising at least one ply of resin impregnated paper;

wherein at least one ply of paper is impregnated with a resin composition comprising at least one thermosetting resin;

wherein the core layer has a Vicat softening temperature of at least 80 degrees Celsius and wherein the upper core surface of the core layer has a Shore D hardness of at least 85.

2. The panel according to claim 1, wherein the at least one ply of resin impregnated paper is in direct contact with the upper core surface of the core layer.

3. The panel according to claim 1, wherein the at least one ply of resin impregnated paper comprises at least 1 wt % of at least one polymeric adhesive.

4. The panel according to claim 3, wherein the at least one polymeric adhesive of the resin composition comprises polyurethane, polyester and/or a polyepoxide.

5. The panel according to claim 1, wherein the at least one ply of resin impregnated paper has a weight of at least 40 grams.

6. The panel according to claim 1, wherein the at least one ply of resin impregnated paper has a resin load of at least 100%.

7. The panel according to claim 1, wherein at least one polymer of the composite material is selected from polyvinylchloride, polypropylene, polyethylene terephthalate, polystyrene, polyethylene, polyurethane, acrylonitrile butadiene styrene and/or co-polyester.

8. The panel according to claim 1, wherein at least one mineral material of the composite material is a magnesium-based mineral material selected from magnesium oxide, magnesium chloride and/or magnesium oxysulfate.

9. The panel according to claim 1, wherein the composite material further comprises at least one additive configured to increase the Vicat softening temperature, wherein the at least one additive comprises acrylonitrile styrene acrylate, acrylonitrile butadiene styrene, a thermoset system and/or an epoxy system.

10. The panel according to claim 1, wherein the upper core surface of the core layer has a surface energy of at least 50 dyn/cm.

11. The panel according to claim 1, wherein the upper core surface of the core layer has a roughness of at least 0.5 µm.

12. The panel according to claim 1, comprising at least one backing layer comprising the at least one ply of resin impregnated paper, wherein the at least one ply of resin impregnated paper is impregnated with a resin composition comprising at least one thermosetting resin.

13. The panel according to claim 1, wherein the top layer comprises a plurality of abrasion resistant particles selected from aluminum oxide, corundum, silicon carbide, titanium dioxide, titanium oxide and/or diamond particles.

14. The panel according to claim 1, wherein the panel comprises two pairs of opposite side edges, wherein at least one pair of the opposite side edges is provided with complementary coupling parts.

15. A method for producing a decorative panel according to claim 1, comprising the steps of:
a) providing at least one core layer, the core layer comprising an upper core surface and a bottom core surface, which core layer comprises a composite material comprising at least one mineral material and at least one polymer, wherein the core layer has a softening temperature of at least 80 degrees Celsius and wherein the upper core surface of the core layer has a Shore D hardness of at least 85;
b) providing at least one top layer comprising at least one ply of resin impregnated paper upon the upper core surface of said core layer, wherein at least one ply of paper is impregnated with a resin composition comprising at least one thermosetting resin;
c) applying a pressure of at least 12 MPa and a temperature of at least 130 degrees Celsius onto the upper surface of the top layer for a first predetermined amount of time;
d) reducing the temperature to a value below 40 degrees Celsius whilst remaining the pressure of at least 12 MPa for a second predetermined amount of time.

16. The method according to claim 15, wherein the first predetermined amount of time is in the range of 30 to 60 minutes and/or wherein the second predetermined amount of time is in the range of 5 to 30 minutes.

17. The method according to claim 15, wherein the temperature applied during step c) is in the range of 130 to 150 degrees Celsius.

18. The method according to claim 15, wherein the upper core surface of the core layer is annealed, sanded and/or corona treated prior to step c).

19. The method according to claim 15, further comprising step e) annealing at an annealing temperature of at least 90 degrees Celsius and a substantially constant pressure of at least 1 Mpa for at least 1 minute.

* * * * *